May 25, 1948.　　　　M. F. GUNNING　　　　2,442,125
HYDRAULIC MOTOR AND CONTROL THEREFOR
Filed Feb. 22, 1945　　　　9 Sheets-Sheet 1

Inventor
M.F. GUNNING
By
Attorneys

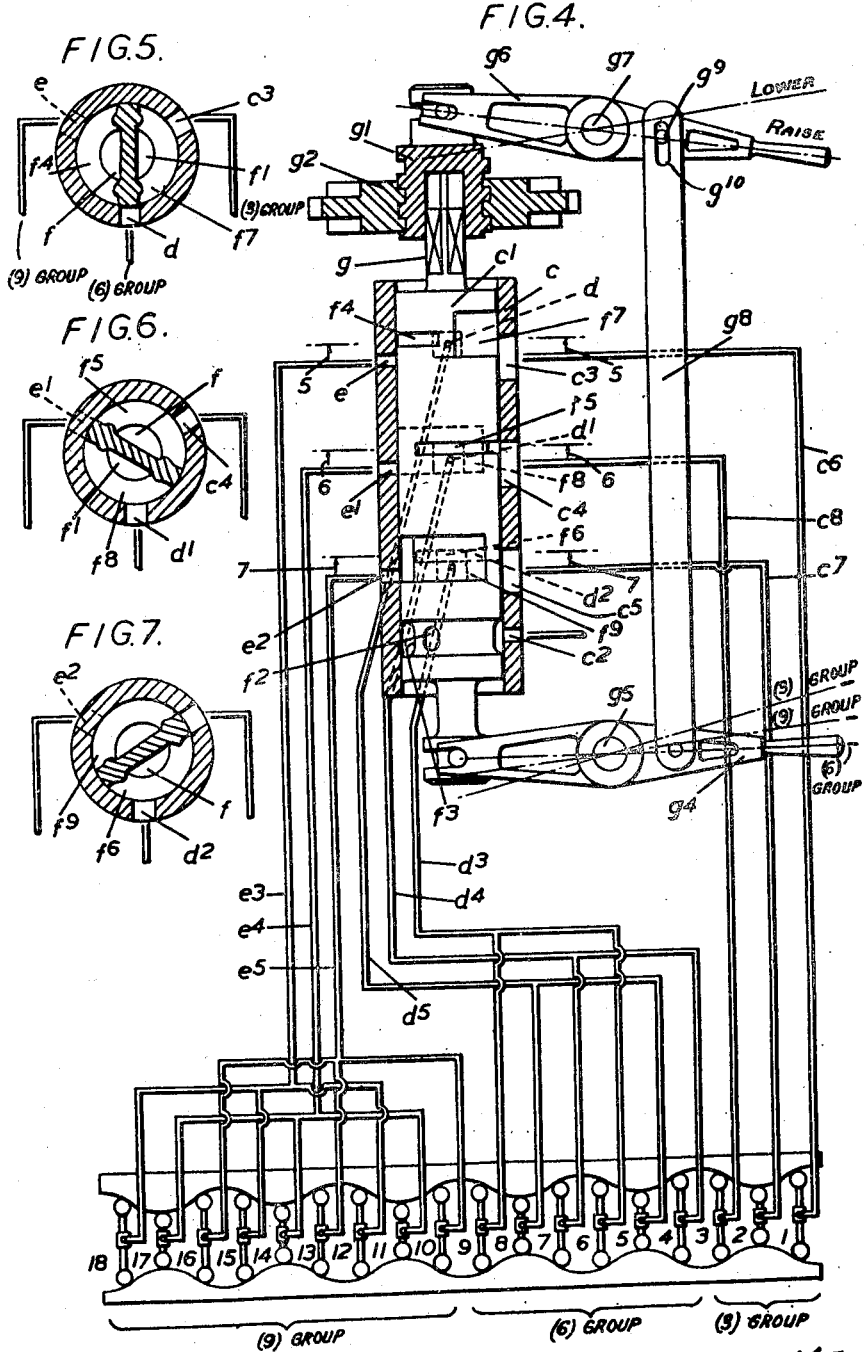

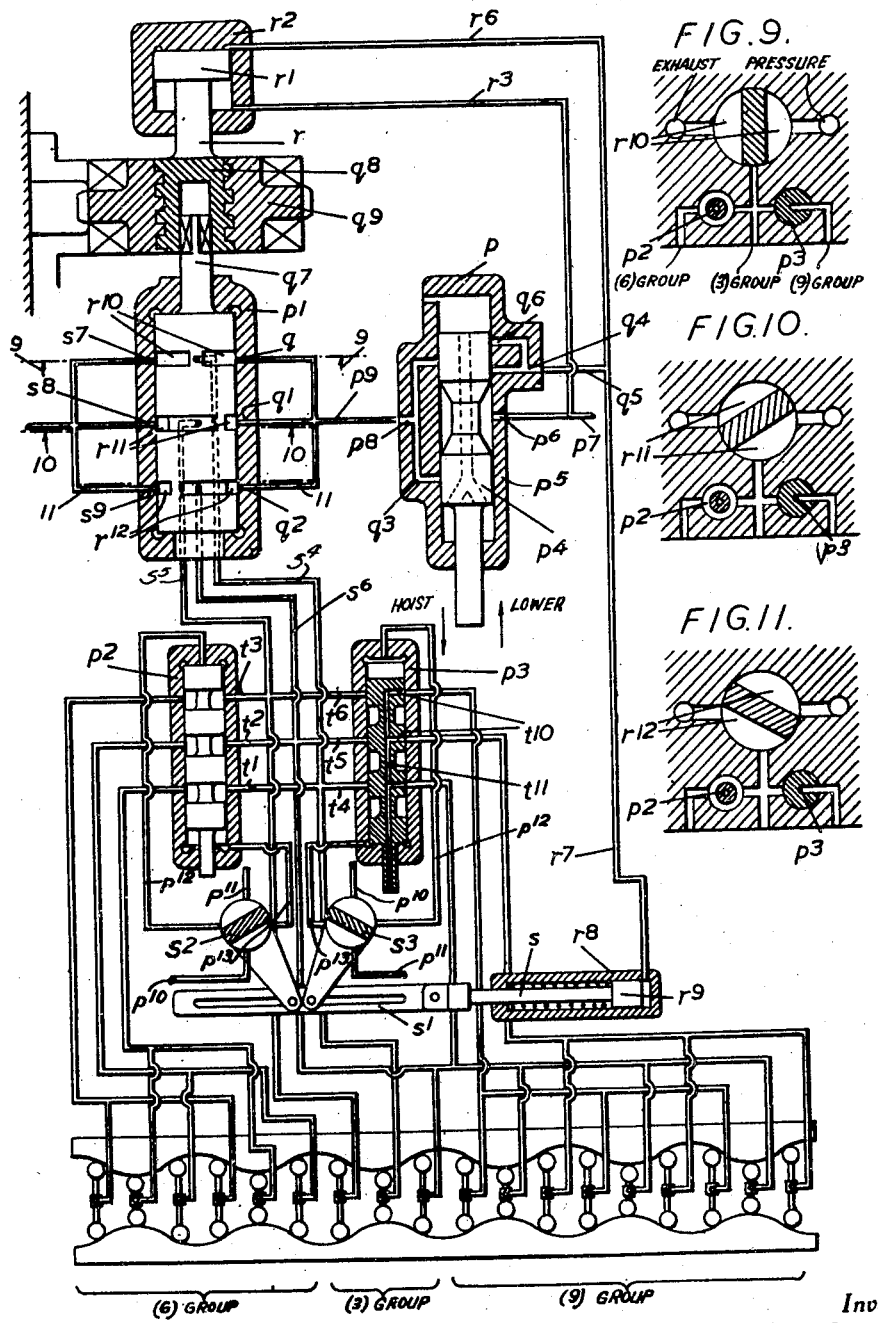

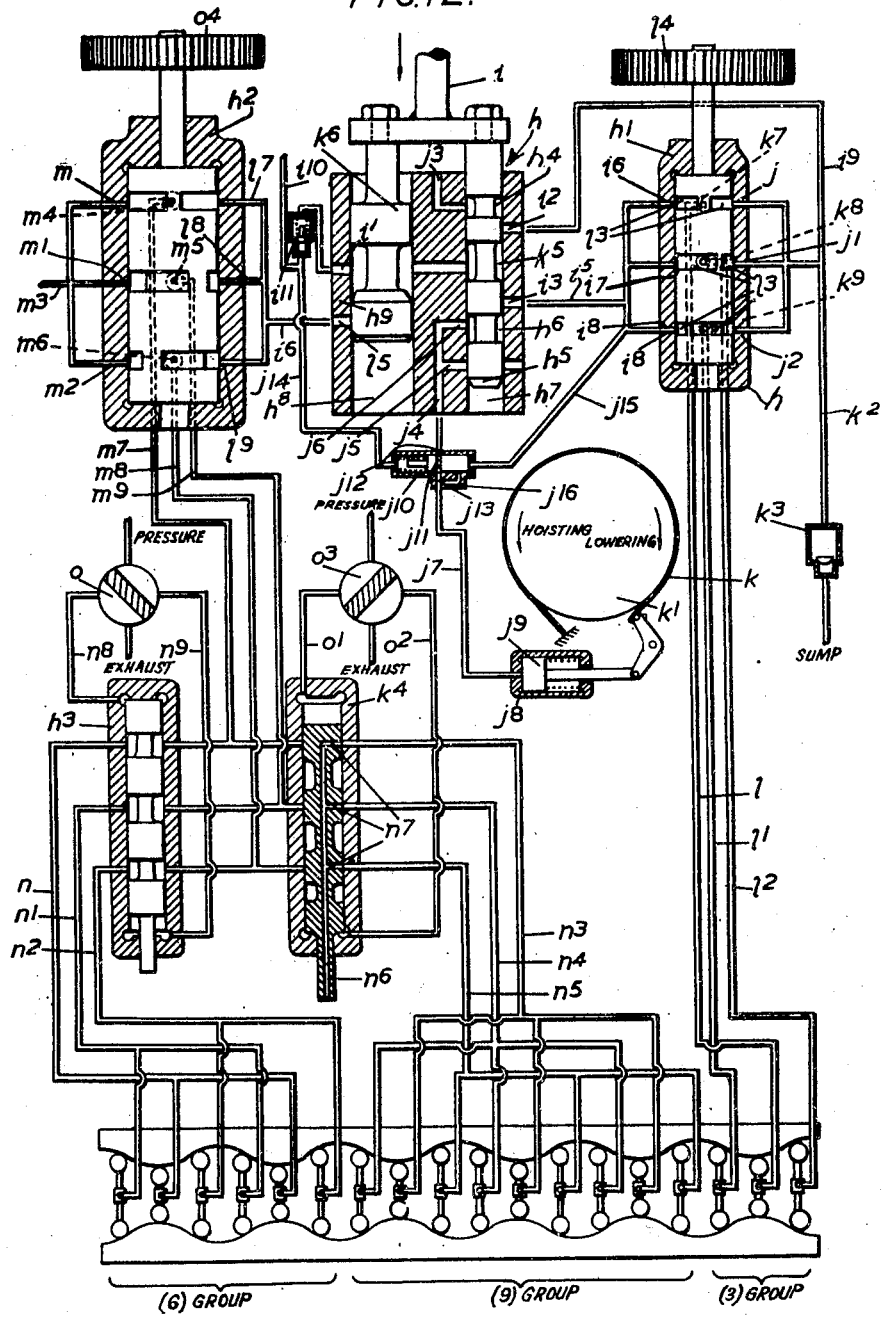

May 25, 1948.       M. F. GUNNING       2,442,125
HYDRAULIC MOTOR AND CONTROL THEREFOR
Filed Feb. 22, 1945      9 Sheets-Sheet 6

Inventor
M.F. GUNNING.
By
Attorneys

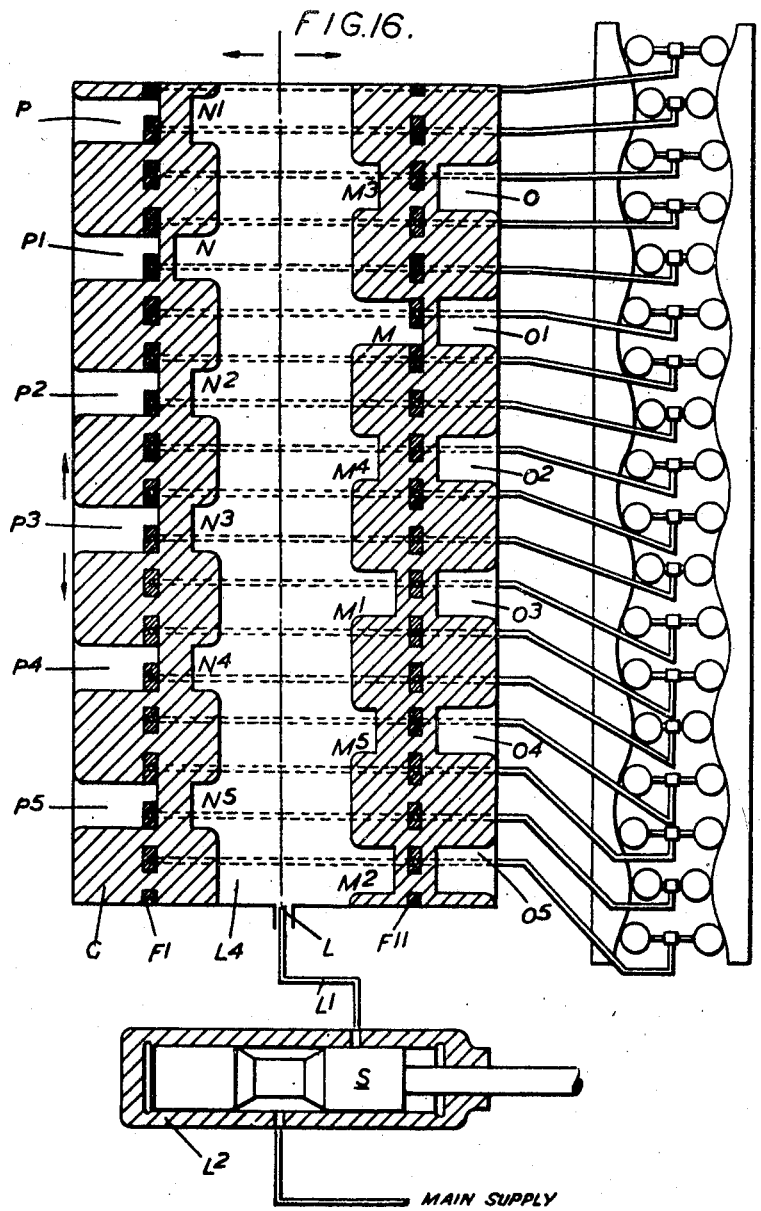

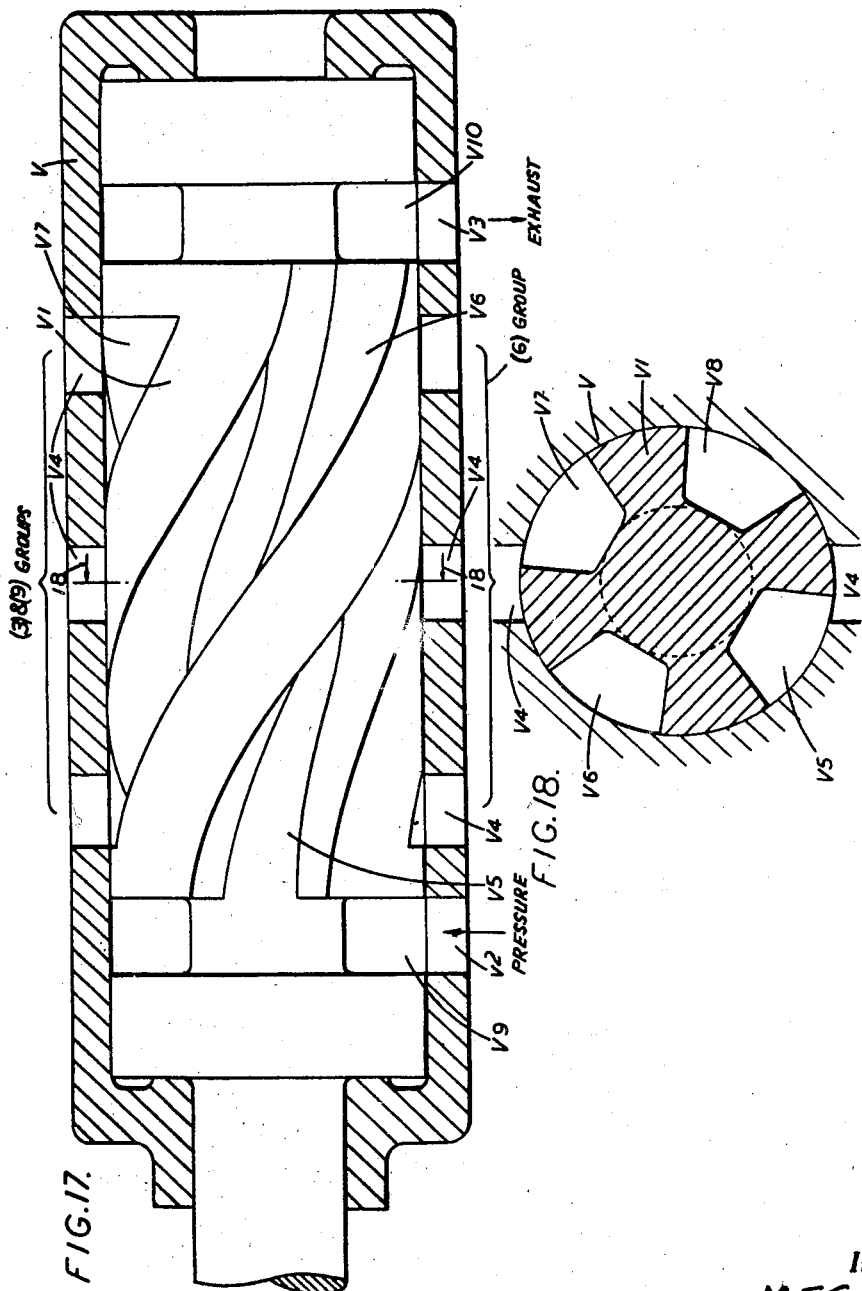

Patented May 25, 1948

2,442,125

UNITED STATES PATENT OFFICE 2,442,125

HYDRAULIC MOTOR AND CONTROL THEREFOR

Maximiliaan Frederik Gunning, Petersfield, England

Application February 22, 1945, Serial No. 579,197
In Great Britain February 2, 1944

24 Claims. (Cl. 192—3)

This invention relates to hydraulic motors and has for its object to provide a construction of hydraulic motor particularly suitable for use on board ship for the operation of mechanism such as winches, lifts, hoists and slewing gear for cranes, but which also will be suitable for other purposes, and which will be economical in the use of pressure liquid under varying conditions of load.

According to the present invention in a multi-cylinder hydraulic motor the torque can be varied by varying the number of power strokes during each rotation of the motor.

Such variation of the number of power strokes may be obtained by rendering temporarily inoperative some of the cylinders while the others are permitted to remain fully operative.

In an hydraulic motor as above set forth the cylinders for the purpose of control are preferably grouped, full torque being obtained when the cylinders of all groups are rendered fully operative and reduced torque obtained by rendering inoperative the cylinders of one or more groups.

The pressure liquid may be supplied to and exhausted from the cylinders through a rotary distributing valve driven in timed relationship or phase by the motor. Reversal of the motor may be obtained by altering the setting or phasing of the distributing valve or alternatively, reversal may be obtained by reversing the direction of flow of the pressure liquid to and from the distributing valve.

Said distributing valve may serve to control the number of cylinders which are made operative to vary the torque, and also to reverse the flow of pressure liquid to a number of cylinders, the other cylinders being then automatically rendered inoperative.

Alternatively the passage of pressure liquid to one or more groups of cylinders may be controlled by a selector valve or valves which is/or are closed automatically when the motor is reversed. In such hydraulic motor the distributing valve may be supplied through a control valve by the operation of which the setting or phasing of the distributing valve can be altered and the selector valve or valves automatically closed so that the motor will reverse with the minimum number of cylinders operative.

If desired there may be two distributing valves, the pressure liquid being supplied to and exhausted from the cylinders of one group by one of the valves and supplied to and exhausted from the cylinders of the other group or groups by the other distributing valve, both distributing valves being driven in timed relationship or phase by the motor and variation of torque obtained by the operation of a selector valve or valves by which is controlled the supply of pressure liquid to the group or groups of cylinders supplied by the second distributing valve. To obtain minimum torque when the motor is being driven in either direction by the pressure liquid, said selector valve or valves is/or are closed and pressure liquid supplied to and exhausted from the first group by the corresponding distributing valve.

The cylinders which are operative when the motor is giving minimum torque may be of lesser diameter than the other cylinders so as to reduce the amount of pressure liquid required by the motor when giving minimum torque.

In the event of the direction of rotation of the motor being reversed under the action of an excessive load, a number of cylinders with their associated pistons may operate so as to reverse the flow of the liquid and by the provision of a non-return valve or other controlling means, build up a back pressure, such back pressure being utilized to operate means for controlling the motor or winch or the like driven thereby.

In the event of the back pressure exceeding the main supply presure it may open a valve by which pressure liquid is then supplied to operate a brake. Alternatively in the event of the back pressure exceeding the main supply pressure such back pressure may operate the motor controls so that the motor will rotate with full torque against the action of the load.

The invention further consists in a hydraulic motor as above set forth wherein to reverse the motor only some of the cylinders are supplied with pressure liquid and the pressure liquid exhausted from said cylinders used to control the motor. The pressure liquid exhausted from said cylinders can be utilized to apply a brake or the pressure liquid exhausted from the said cylinders may be supplied under presure to a closed circuit including the other operative cylinders, the pressure being sufficient to make up any leakage or shortage therein, means being provided to throttle the flow of pressure liquid in said circuit so as to control the lowering speed of the motor.

Conveniently the cylinders are carried in a fixed member or stator which lies around the shaft driven by the motor, the cylinders being spaced apart circumferentially with their axes parallel to the axis of the shaft and the pistons in the cylinders acting through rollers or other members on a single cam track or a pair of oppositely arranged cam tracks carried by the driven shaft.

As an alternative construction of hydraulic motor, variation in torque is obtained by varying the number of power strokes which each piston makes during each rotation of the motor. In such motor the cams which are operative when the motor is delivering minimum torque may impart to the pistons a smaller stroke than the other cams.

This motor may comprise an annular member or stator provided with a circumferentially arranged series of cylinders each having inlet and exhaust ports communicating therewith, pistons working in said cylinders and carrying rollers or like members, a rotor comprising a shaft, a distributing valve which rotates with but is capable of axial adjustment on the shaft and one or a pair of cam tracks with which said rollers or like members are arranged to co-operate so as to impart a rotary movement thereto and therefore to the shaft and valve, the said valve having slots or ports so arranged that by varying the axial position thereof the number of times pressure liquid is supplied to each cylinder, and therefore the number of power strokes, can be varied during each rotation of the rotor.

Yielding means may be provided by which the rollers or other members operated by the pistons working within the cylinders are maintained continuously against the cam track, irrespective of any hydraulic pressure on the pistons and irrespective of the position of the pistons.

The parts associated with each cylinder may comprise a crosshead guide connected thereto, a piston, a crosshead member and a roller carried by the crosshead and adapted to act on a cam track and springs by which the rollers or other members are held against the cam track, said cylinder assembly being made up as a complete unit which can be readily mounted in a suitable carrier member where the piston can act on and transmit torque to the cam track or crankshaft.

The invention still further consists in a multi-cylinder hydraulic motor in which the torque can be varied by varying the number of power strokes during each rotation of the motor, characterised in that the motor is controlled by a combined control and reverse valve operated by the combined action of a handwheel and of hunting gear driven by the motor.

The accompanying drawings illustrate more or less diagrammatically and by way of example two constructions of hydraulic motors and means for controlling them in accordance with the invention. In these drawings:

Figure 4 illustrates the distributing valve in section, means for operating said distributing valve and the pipe connections leading to the cylinders.

Figures 5, 6 and 7 are cross sections through the distributing valve on the lines 5—5, 6—6 and 7—7 respectively, in Fig. 4, looking as indicated by the arrows.

Figure 8 illustrates means embodying a main control valve and single distributing valve for supplying pressure liquid to the cylinders.

Figures 9, 10 and 11 and diagrammatic cross sections through the distributing valve on the lines 9—9, 10—10 and 11—11 respectively, in Figure 8, looking as indicated by the arrows.

Figure 12 illustrates means embodying two distributing valves for supplying pressure liquid to the cylinders and an hydraulically operated friction brake for controlling the winch.

Figure 13:
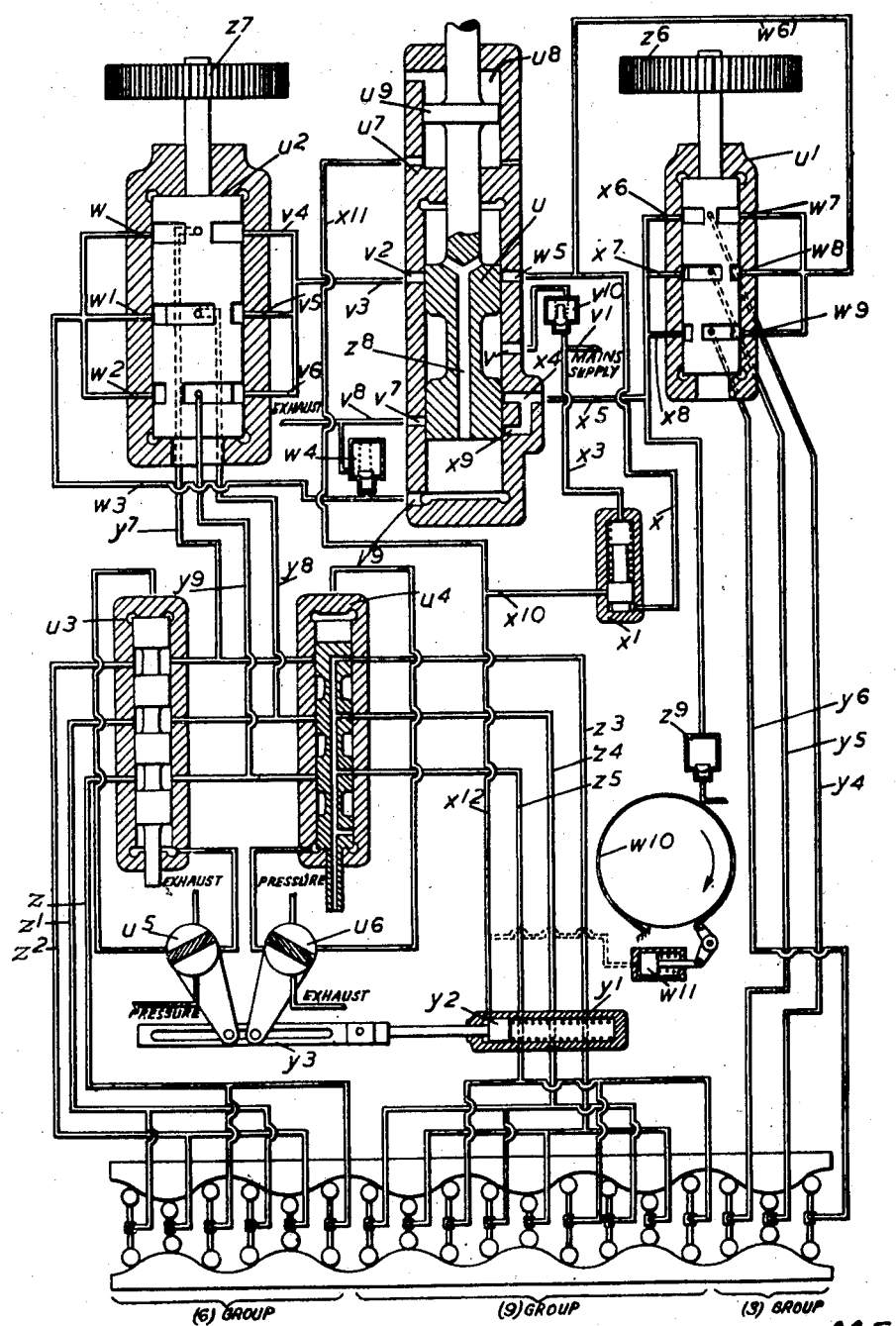

Figure 13 illustrates another arrangement embodying two distributing valves with main control valve for supplying pressure liquid to the cylinders, the braking means being purely hydraulic.

Figure 14:
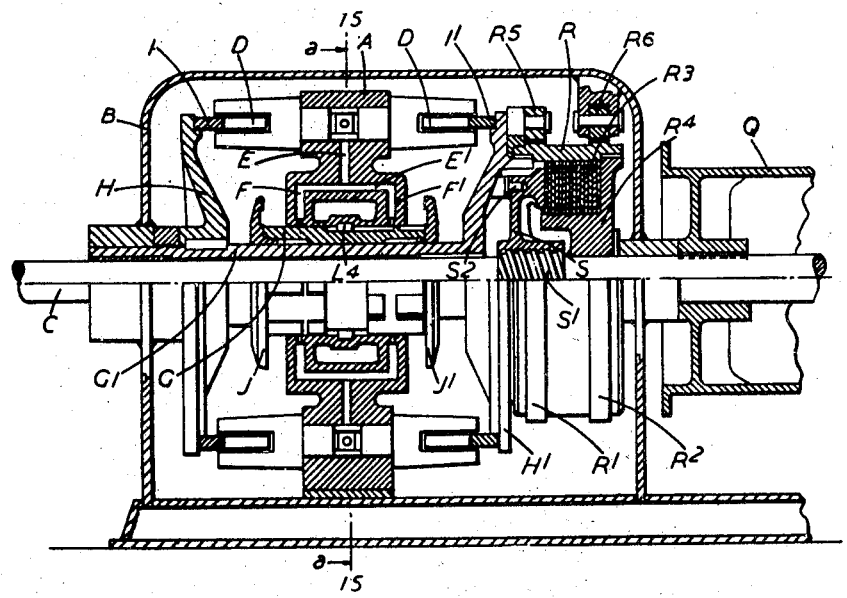

Figure 14 illustrates in longitudinal cross section another construction of motor in accordance with the invention.

Figure 15:
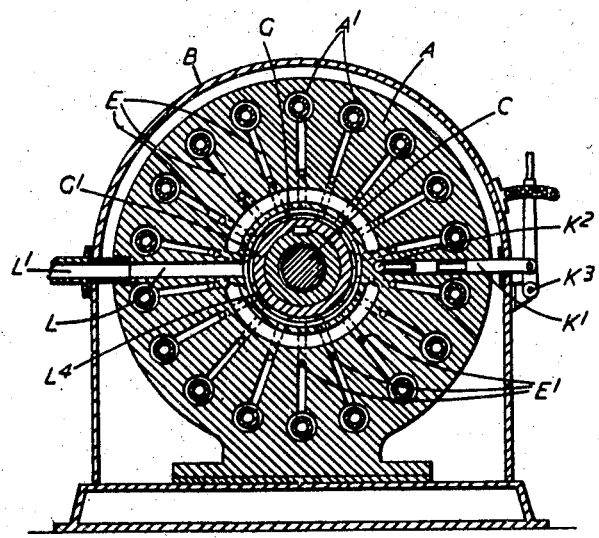

Figure 15 is a section on the line 15—15 in Figure 14 and

Figure 16 shows the distributing valve diagrammatically as a development.

Figure 17 is an elevation partly in section of an alternative construction of distributing valve.

Figure 18 is a section on the line 18—18 in Figure 17 and

Figure 19:
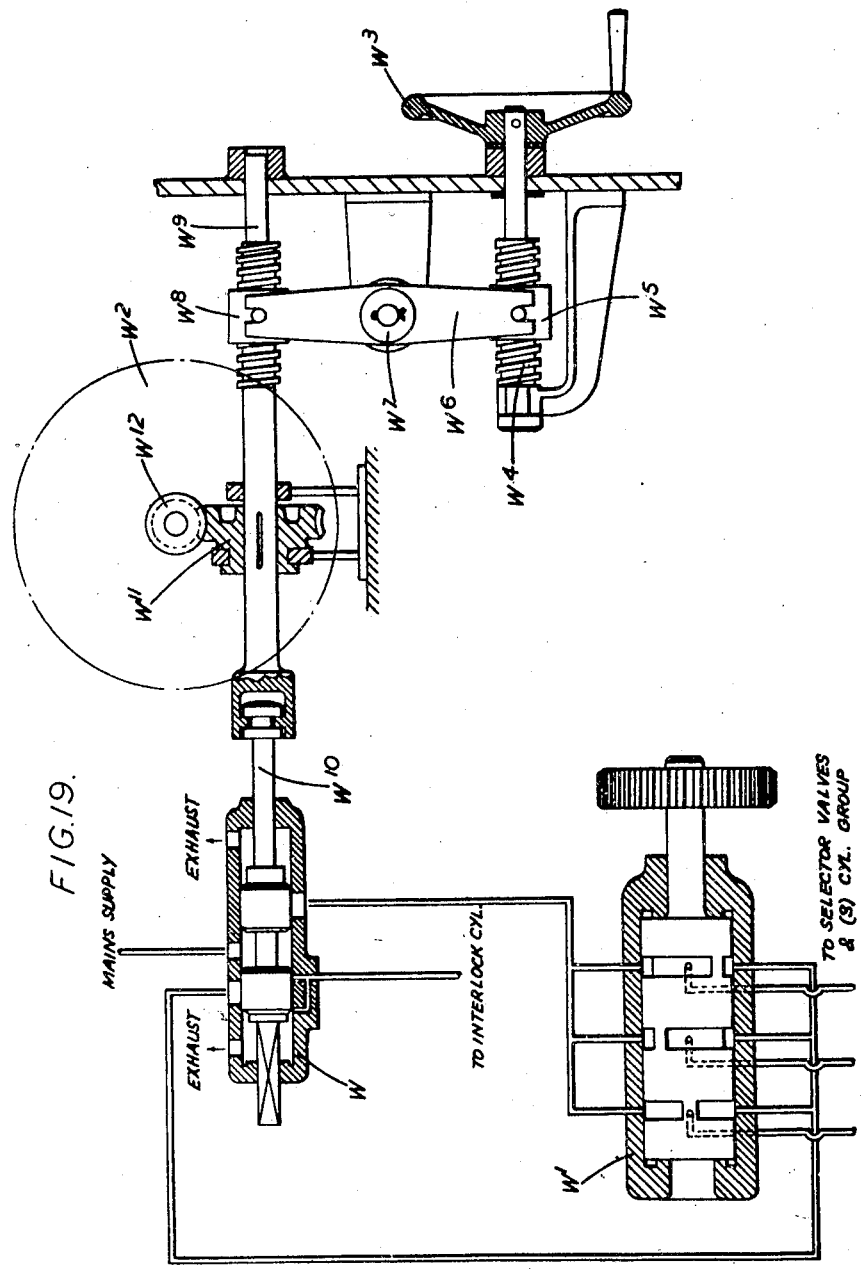

Figure 19 illustrates diagrammatically the application of hunting gear to the control valve.

In describing the operation of the motors and the control arrangements it will be assumed that a winch is being driven thereby, although it will be understood that the motors can be used for other purposes as above set forth.

Figure 1:
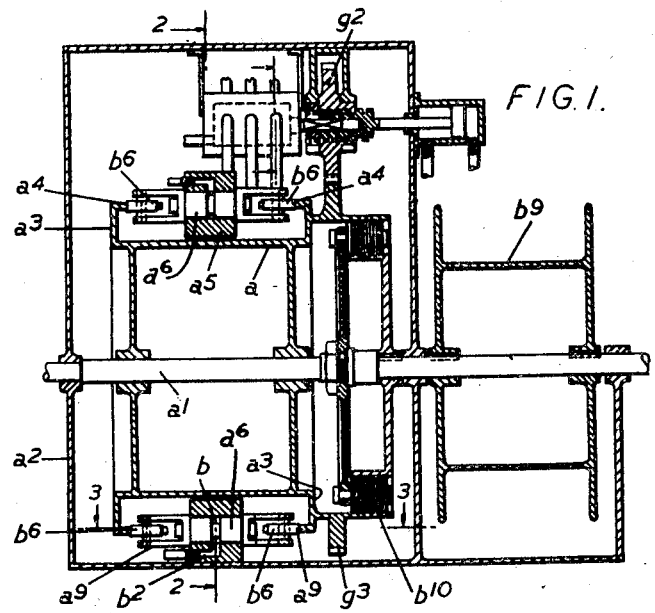
Figure 1 is a longitudinal sectional elevation of one of said hydraulic motors in combination with a winch.
Figure 2:
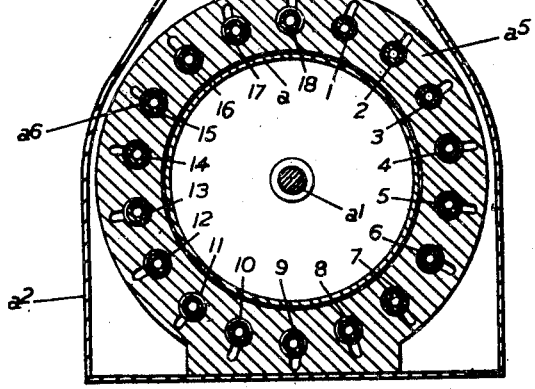
Figure 2 is a transverse section on the line 2—2 Figure 1.

Referring to Figures 1 and 2; the improved motor comprises a drum like body or rotor $a$ rotatably mounted on a shaft $a^1$ carried in bearings in a casing $a^2$. At each end of the drum like body is a flange $a^3$ which serves as a support for a cam track $a^4$ whose contours may be as shown in Figures 4, 8, 12, 13, and 16. These cam tracks face each other and have similar undulations. In the drawings each cam track is shown provided with six undulations.

Between the cam tracks and surrounding the central part of the drum like body is mounted an annular body or stator $a^5$ which is fixed to the casing $a^2$ or like adjacent stationary part and carries the cylinders $a^6$. In the construction shown, see Figure 2, there are eighteen pairs of aligned cylinders and for convenience in reference thereto hereinafter the cylinders are respectively numbered in Figure 2 and their positions are indicated by the same numbers in Figure 4.

Figure 3:
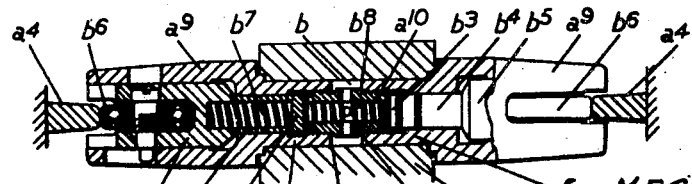
Figure 3 is a section through one of the cylinders on the line 3—3 in Figure 1.

As seen in Figure 3 each pair of aligned cylinders is formed of two similar co-axial members inserted into the opposite ends of holes $a^7$ which run through the annular body $a^5$, each cylinder $a^6$ comprising a tubular part and parallel crosshead guides $a^9$ which extend from the outer end of the tubular part. The inner ends of each pair of aligned cylinders are connected within the hole $a^7$ by a screwed sleeve $a^{10}$ so that the opposed ends of the tubular parts are somewhat spaced apart leaving an annular space $b$ round the sleeve with which the interior of the cylinder communicates through holes $b^1$ in the sleeve. Pressure liquid can flow to and from the cylinders through a passage $b^2$ in the annular body $a^5$.

Two pistons reciprocate oppositely in each cylinder $a^6$, each piston comprising a head $b^3$ and a trunk $b^4$ the end of which is adapted to abut against a crosshead member $b^5$ which reciprocates between the guides $a^9$, and carries a roller $b^6$ which bears on a cam track $a^4$. The contour of the undulations forming the cam track is such that an harmonic or substantially harmonic motion is imparted to the pistons during their outward (power) stroke and their inward (exhaust) stroke.

Within the trunk of each piston, with certain exceptions to be referred to later, is a coiled compression spring $b^7$ which, when no pressure liquid is operative in a cylinder will maintain the piston therein at the inner part of the cylinder while leaving the crosshead with roller free to reciprocate with the roller constantly bearing on the cam track. The ends of the sleeve $a^{10}$ constitute stops to restrict the inward movement of the pistons. To enable the cylinders and pistons to fill themselves with liquid when the supply of pressure liquid fails a compression spring $b^8$ is introduced therebetween. Either or both the springs $b^7$ and $b^8$ may be eliminated according to the particular mode of operation of the individual cylinder, as will appear later.

The parts associated with each cylinder and comprising a tubular part with crosshead guides $a^9$ connected thereto, a piston, crosshead member $b^5$ with spring interposed between it and the piston to which the crosshead is not directly connected but with which it is in contact when pressure liquid in the cylinder acts on the piston and has compressed the spring, and the roller $b^6$ carried by the crosshead, may together constitute an assembly or complete unit which can be readily mounted in the body $a^5$.

On the shaft $a^1$ of the motor is a winch drum $b^9$ on which a rope can be wound and the load on the winch can be controlled by any means. In Figure 1 a multi-disc load operated friction brake $b^{10}$ is provided for this purpose. Said brake, although of known construction, will be described later.

It will be apparent from Figure 4 that if pressure liquid is alternately introduced to and exhausted from a pair of aligned cylinders the pistons therein will, by the rollers operating on the cam tracks, impart through the load operated friction brake a torque to the shaft $a^1$ and thereafter the continued rotation of the cam tracks will force the rollers inwards to exhaust the liquid from the cylinders.

One arrangement by which a variable torque can be applied to the shaft will now be described with reference to Figures 4 to 7.

The cylinders are grouped to form three groups, a first group of three cylinders, cylinders 1, 2 and 3, a second group formed of six cylinders, cylinders 4, 5, 6, 7, 8 and 9, and a third group formed of nine cylinders, cylinders 10, 11, 12, 13, 14, 15, 16, 17 and 18. Said groups are hereafter throughout the specification referred to as the three group, the six group and the nine group respectively, but it will be understood that the number of cylinders in the groups and the number of groups may be varied as desired. Here it should be noted that the cylinders of the three group may be of a substantially less diameter than the other cylinders, as indicated in Figure 2.

The supply of pressure liquid to said cylinders is controlled by means of a combined distributing and reversing valve. This valve comprises a cylindrical casing $c$ and a piston valve $c^1$ capable of an axial and also a rotary movement in the casing.

The casing is provided with an inlet port $c^2$ which is connected to an accumulator or other source of pressure liquid by which pressure liquid is supplied, three axially aligned elongated ports $c^3$, $c^4$ and $c^5$ which are connected by pipe lines $c^6$, $c^8$ and $c^7$ respectively to the three cylinders of the three group, three not so elongated ports $d$, $d^1$ and $d^2$ which are connected by pipe lines $d^5$, $d^4$ and $d^3$ respectively and branch lines to the cylinders of the six group and three narrower ports $e$, $e^1$ and $e^2$ connected by pipe lines $e^3$, $e^4$ and $e^5$ and branch lines to the cylinders of the nine group. The relative positions of said ports is shown in Figures 5, 6 and 7.

The piston valve is provided with a pressure supply passage $f$ and an exhaust passage $f^1$, both passages being spiral and passing longitudinally through the piston. Inlet passage $f$, which is closed at its upper end, communicates by way of a port $f^2$ with an annulus $f^3$ to which the pressure liquid is led through port $c^2$ when the motor is being driven. The lower end of the exhaust passage is closed and the upper end thereof discharges into a sump, not shown. The piston valve is provided with three pressure supply slots $f^4$, $f^5$ and $f^6$ each arranged 120° in advance of the one following and each communicating with the passage $f$. The piston valve is also provided with three exhaust slots $f^7$, $f^8$ and $f^9$ which communicate with the exhaust passage $f^1$ and which slots irrespective of any axial adjustment of the piston valve, will communicate during the rotation of the valve with the ports connected to all the cylinders.

The piston valve is provided with a squared spindle $g$ on which is fitted so as to be capable of an axial but not a relative rotary movement, an externally threaded sleeve $g^1$ on the screwed portion of which is fitted a toothed wheel $g^2$ incapable of an axial movement with respect to the valve casing. With said wheel $g^2$ meshes a toothed wheel $g^3$ fast on the shaft $a^1$, Fig. 1, the gearing being such that the piston valve will make six rotations for each rotation of the said shaft $a^1$.

A hand lever $g^4$, pivoted at $g^5$ is provided to move the piston valve axially relative to its enclosing casing and a second lever $g^6$ pivoted at $g^7$ is provided to move the sleeve $g^1$ axially and thereby impart a partial rotary movement to the piston valve with respect to the gear wheel $g^2$.

The two levers are interlocked by a link $g^8$, which is pivotally secured to the lever $g^4$ and loosely connected to the lever $g^6$ by a pin $g^9$ working in a slot $g^{10}$ near the end of the link $g^8$ so as to permit sufficient independent movement of the two levers to provide for lifting operation with any or all groups of cylinders working but to prevent lowering operation with any cylinders receiving pressure fluid other than those of group three.

The improved motor operates as follows:

A control valve, not shown, is operated to permit the pressure liquid to pass to the inlet port $c^2$, into the annulus $f^3$, through port $f^2$ into the passage $f$.

When it is desired to hoist with minimum torque, that is raise an empty hook, the lever $g^4$ is operated to lower the piston valve to its lowest position and in that case the pressure slots $f^4$, $f^5$ and $f^6$ and the exhaust slots $f^7$, $f^8$ and $f^9$ will register successively with the three ports $c^3$, $c^4$ and $c^5$ communicating through pipe connections $c^6$, $c^8$ and $c^7$ with the cylinders of the three group, it being understood that the piston valve is rotated in phase or timed relationship with the shaft $a^1$.

The pressure fluid is thereby successively supplied to and exhausted from the cylinders of the three group only. Consequently the motor is driven by the three group only, i. e. with minimum torque. As the cylinders of the three group are of smaller diameter than the cylinders of the other groups, they take less pressure liquid than would be the case if they were of the same diameter.

To obtain maximum torque the lever $g^4$ is operated to raise the valve to its next position so that the pressure slots $f^4$, $f^5$ and $f^6$ and exhaust slots $f^7$, $f^8$ and $f^9$ during each rotation of the piston valve are placed in communication with all the ports in the valve casing, i. e. ports $c^3$, $c^4$ and $c^5$ connected by the pipe connections $c^6$, $c^8$ and $c^7$ to the cylinders of the three group, ports $d$, $d^1$, and $d^2$ connected by pipe connections $d^5$, $d^4$ and $d^3$ to the cylinders of the six group, and ports $e$, $e^1$ and $e^2$ connected by pipe connections $c^3$, $e^4$ and $e^5$ to the cylinders of the nine group. Thus liquid is supplied to the cylinders of the three, six and nine groups, and as all cylinders are operative maximum torque is thereby obtained.

To obtain half torque the piston valve is raised to its top position so that the pressure slots $f^4$, $f^5$ and $f^6$ and exhaust slots $f^7$, $f^8$ and $f^9$ register with the ports in communication with the three and six groups only, i. e. with the ports $c^3$, $c^4$, $c^5$, $d$, $d^1$ and $d^2$. Thus only nine cylinders are effective and half torque obtained.

When the motor is being driven to hoist the load it drives the winch through the said load operated multi-plate friction brake.

The said control valve, not shown, can be operated to control the supply of pressure fluid to the distributing valve, the supply being more or less throttled to reduce the speed of the motor and cut off to stop the motor.

During the foregoing operations of the piston valve by the lever $g^4$ no movement is transmitted by the link $g^8$ to the lever $g^6$ by reason of a pin and slot connection at the upper end of the link.

In order to lower a load or lower an empty hook the lever $g^6$ is operated to force the sleeve $g^1$ downwards. Should the motor be running on full torque or on half torque such movement of the lever $g^6$ will be transmitted through link $g^8$ to lever $g^4$ so that the piston valve is moved to the position wherein only the cylinders of the three group are rendered operative. If lever $g^4$ is already in that position it will remain unaffected.

In its downward movement, the sleeve $g^1$ is rotated through 180° relative to the gear wheel, and this in turn results in pressure fluid being supplied to the cylinders which prior to such movement of the valve were exhausting and the cylinders which were receiving pressure liquid immediately commencing to exhaust. This in turn results in the direction of rotation of the motor being reversed and if an empty hook is being lowered, the motor is driven with minimum torque.

If a load is being lowered the load drives the motor which is then controlled by the multi-plate friction clutch. The motor when driven in the reverse direction slackens off the brake as the load is being lowered. The load really follows up the winch and the lowering speed is proportioned to the amount of pressure liquid admitted by the control valve to the three group.

By inserting springs between the pistons and crossheads as aforesaid the pistons do not reciprocate when their respective cylinders are not supplied with pressure fluid and therefore they do not create a negative back pressure. Further without the provision of the springs the rollers would leave the cam tracks when pressure fluid is not being supplied to their respective cylinders and when pressure fluid is again supplied thereto the rollers would hit the tracks with a sharp impact. The spring loading as above set forth overcomes both of said difficulties.

By making the cylinder assembly units as aforesaid they can be made in quantity and finished and the parts assembled apart from the parts in which they are to be mounted and the winch or other mechanism in the driving of which they are to be employed. The replacement of any cylinder can be readily effected and when initially erecting a mechanism on the spot the mechanism can be built up of parts which have been finished in the shop.

In the arrangement illustrated in Figures 8 to 11 the winch is likewise controlled by a load operated multi-plate friction brake.

The pressure liquid is supplied by a control valve $p$ to a distributing valve $p^1$ through which it is supplied to the three group and through selector valves $p^2$ and $p^3$ to the six and nine groups.

The control valve consists of a piston valve $p^4$ working within a valve body $p^5$. The latter is provided with a port $p^6$ connected to a pressure liquid supply line $p^7$ and a port $p^8$ connected by a pipe line $p^9$ and branch lines to three ports, $q$, $q^1$ and $q^2$ in the casing of the distributing valve $p^1$. Port $p^8$ communicates with a longitudinally extending passage $q^3$ in the valve body $p^5$, the two ends of which passage communicate with the interior of the latter. Towards the upper end of the valve body $p^5$ is a radial passage $q^4$ connecting the interior of the valve body with a pipe line $q^5$ and with said passage communicates a passage $q^6$ which in turn communicates with the interior of the valve body near its upper end.

The distributing valve $p^1$ is rotatable and is carried by a rod $q^7$ the end of which is squared and fits within an externally threaded sleeve $q^8$ on which is screwed a toothed wheel $q^9$. The latter is driven in phase with the motor by said wheel meshing with gear wheel $g^3$. Said sleeve is carried by a piston rod $r$, the piston $r^1$ working within an hydraulic cylinder $r^2$. Pressure liquid is delivered to the underside of the piston by pipe line $r^3$ connected to supply line $p^7$ and delivered to the upper side thereof by pipe line $r^6$ connected to pipe line $q^5$. Also connected to pipe line $q^5$ is a second pipe line $r^7$ which leads to a hydraulic cylinder $r^8$ in which works a spring loaded piston $r^9$ carried by a piston rod $s$ which is connected by means of a slotted rod $s^1$ and pins working therein with the two selector operating valves $s^2$ and $s^3$ controlling the selector valves $p^2$ and $p^3$ respectively.

The distributing valve $p^1$ is in the form of a cylinder having cut therein three pairs of pressure and exhaust ports $r^{10}$, $r^{11}$ and $r^{12}$ which as the valve is rotated register alternately with the said three ports $q$, $q^1$ and $q^2$, with three ports connected to pipe lines $s^4$, $s^5$ and $s^6$ and three exhaust ports $s^7$, $s^8$ and $s^9$ which are connected by pipe lines to the sump.

Said pipe lines $s^4$, $s^5$ and $s^6$ lead respectively to the three cylinders of the first group. Also connected to said pipe lines are two sets of lines $t^1$, $t^3$ and $t^2$ and $t^4$, $t^6$ and $t^5$ leading respectively to the selector valves $p^2$ and $p^3$. Pipe lines from the two selector valves lead to the six and nine groups of cylinders.

Said selector valves are controlled by the two valves $s^2$ and $s^3$ which in the arrangements shown are four way cocks each having pipe lines $p^{10}$ and $p^{11}$ respectively connected to pressure and exhaust and further lines $p^{12}$ and $p^{13}$ respectively connected to the top and bottom of each selector valve casing.

Should it be desired to raise a load or empty hook by the three group the selector valves are both closed so that no pressure liquid can pass to the six and nine group. The control valve $p^4$ is lowered so that pressure liquid can pass through said valve, port $p^8$ and pipe line $p^9$ to the distributing valve and then through the distributing valve to the pipe lines $s^4$, $s^5$ and $s^6$ leading to the cylinders of the three group, the exhaust from said cylinders passing back through the pipe lines to the distributing valve and from the latter, through ports $s^7$, $s^8$ and $s^9$ to the sump.

By opening either of the selector valves, which can be done by operating manually either of the valves $s^2$ and $s^3$, pressure liquid can also be delivered to the cylinders of the corresponding group or to the cylinders of both groups. Thus with or to the cylinders of both groups. Thus with the combination of cylinders set forth the torque can be imparted by the three group, the three and six group, the three and nine group or by all groups if required.

Now assume it is desired to lower a load or empty hook.

The control valve is raised so that pressure liquid is delivered through pipe lines $q^5$ and $r^7$ to the cylinder $r^8$ and the piston $r^9$ automatically operates the valves $s^2$ and $s^3$ so that the selector vales are closed, should one or both of them be open.

Further, pressure liquid is supplied to the upper end of cylinder $r^2$, and forces downwards the piston $r^1$. This results in the sleeve and distributing valve being rotated 90° and what were the pressure ports become the exhaust port and vice versa and the motor will commence to rotate backwards.

The reversal of the motor results in the multi-disc brake being slackened off allowing the load to follow up.

If there is no load on the hook the winch drum is driven by the motor which is driven by the cylinders of the first group.

It will be noted that when the selector valves are closed the liquid in the cylinders put out of action can pass backwards through passages $t^{10}$ and central bores $t^{11}$ in said valves back to the sump said passages then registering with the pipe lines connecting said valves to the cylinders.

In Figure 12 is shown another arrangement for controlling the supply of pressure fluid to obtain variable torque, alternative means for reversing the motor and alternative means for braking the motor.

In this arrangement there is a main control valve $h$, two distributing valves $h^1$ and $h^2$, one for distributing the pressure liquid to the three group and the other for distributing the pressure liquid to the six and nine groups, two selector valves $h^3$ and $h^4$ selectively controlling the passage of pressure liquid to and from the six and nine groups.

The control valve as shown comprises two piston valves $h^5$ and $h^6$ which are capable of axial movement in cylinders $h^7$ and $h^8$ formed in a valve body $h^9$. Said pistons are operated in unison by a rod $i$.

The valve body is provided with an inlet port $i^1$ for connection to a pipe line $i^{10}$ by which pressure liquid is supplied and which port communicates with the two cylinders $h^7$ and $h^8$.

Cylinder $h^7$ has two ports $i^2$ and $i^3$ in the wall thereof, port $i^3$ being connected by a pipe line $i^5$ and branch lines to three ports $i^6$, $i^7$ and $i^8$ in the casing of the distributing valve $h^1$ and port $i^2$ connected by another pipe line $i^9$ to three diametrically opposite ports $j$, $j^1$ and $j^2$ in said distributing valve. Said cylinder $h^7$ is also provided with an exhaust passage $j^3$ at the upper end thereof and a further exhaust passage $j^4$ having two branch passages $j^5$ and $j^6$. Passage $j^4$ is connected by a pipe line $j^7$ to an hydraulic cylinder $j^8$ in which is a spring loaded piston $j^9$ operatively connected to a band brake $k$ enclosing the winch brake drum $k^1$.

In said pipe line $i^{10}$, is introduced a non-return valve $i^{11}$.

Introduced in the pipe line $j^7$ is a spring loaded safety valve $j^{10}$, said valve being of the piston type and the piston provided with an annulus $j^{11}$ which normally registers with diametrically opposite ports $j^{12}$ and $j^{13}$ to which said pipe line $j^7$ is connected.

Said piston is loaded by its spring and by pressure fluid supplied to one end of the safety valve casing by a pipe line $j^{14}$ connected to the pressure supply line $i^{10}$. The other end of said casing is connected by means of a pipe line $j^{15}$ with pipe line $i^5$. In the wall of the safety valve casing there is provided a passage $j^{16}$, one end of which is normally covered by the piston and the other end thereof communicating with the port $j^{13}$.

Pipe line $i^9$ is also connected through a pipe $k^2$ and non-return valve $k^3$ with the sump. Three annular recesses $k^4$ and $k^5$ and $k^6$ are provided in the piston valve $h^5$ and their position with respect to the ports and passages in cylinder $h^7$ will be hereafter made apparent.

The casing of distributing valve $h^1$ is further provided with three ports $k^7$, $k^8$ and $k^9$ which through pipe lines $l$, $l^1$ and $l^2$ communicate with the three cylinders of the three group.

The body of value $h^1$ is in the form of a cylinder $h^9$ having three pairs of circumferentially extending slots $l^3$, each pair being set 120° in advance of the pair immediately below. The valve spindle has fast thereon a gear wheel $l^4$ which meshes with the gear wheel $g^3$ driven by the motor.

Cylinder $h^8$ is provided with a port $l^5$ which communicates through a pipe line $l^6$ and branch lines with three ports $l^7$, $l^8$, and $l^9$ in the casing of the distributing valve $h^2$. Opposite said ports are three further ports $m$, $m^1$ and $m^2$ connected through pipe lines $m^3$ with the sump. There are three further ports $m^4$, $m^5$ and $m^6$ in said casing to which ports are connected pipe lines $m^7$, $m^9$ and $m^8$ each of which is connected to a branch pipe line which branch lines lead to ports in the two selector valves $h^3$ and $h^4$. Directly opposite said ports in each selector valve are three further ports, the ports in selector valve $h^3$, communicating by means of pipe lines $n$, $n^1$ and $n^2$ with the cylinders of the six group, and the ports in selector valve $h^4$ communicating by means of pipe lines $n^3$, $n^4$ and $n^5$ with the cylinders of the nine group.

The piston of each selector valve is provided with three annular recesses and further each is provided with a central bore $n^6$ communicating with branches $n^7$. Pressure liquid supplied through pipe lines $n^8$ and $n^9$ and a manually controlled valve $o$ can be directed to the top or bottom of the casing of selector valve $h^3$ to move the valve therein longitudinally. Likewise pressure liquid supplied through pipe lines $o^1$ and $o^2$ and a manually controlled valve $o^3$ can be directed to the top and bottom of the casing of selector valve $h^4$ to move its valve longitudinally. Said manually operated valves $o$ and $o^3$ may be in the nature of four way cocks. The distributor valve $h^2$ is similar to valve $h^1$ and is rotated by a gear wheel $o^4$ meshing with gear wheel $g^3$.

The operation of the motor will now be described.

To hoist with the three group only, i. e. with minimum torque, the rod $i$ is moved downwards sufficient to permit the port $i^3$ to be placed in communication with the inlet port $i^1$. Pressure liquid is thereby supplied through the pipe line $i^5$, ports $i^6$, $i^7$ and $i^8$ through the slots in the valve $h^1$ to the ports $k^7$, $k^8$ and $k^9$ and thence through the pipe lines $l$, $l^1$ and $l^2$ to the cylinders of the three group. The exhaust from said cylinders passes backwards through said pipe lines $l$, $l^1$ and $l^2$, passes through the other slots in the valve $h^1$ then through pipe line $l^9$, port $i^2$ and passage $j^3$ to the sump.

The phasing of the supply and exhaust of pressure liquid to the cylinders of the three group is such that each follows in rotation at regular intervals, it being understood that the distributing valves are driven in timed relationship with the motor, the valves making three rotations for each rotation of the motor.

It will be noted that if the control valve is pushed too far down it will not render operative either of the other groups, provided the selector valves are closed.

Now assume more torque is required. The rod $i$ is moved further downwards so that port $l^5$ is uncovered and pressure fluid supplied to the distributing valve $h^2$ through pipe line $l^6$. However so long as the selector valves are in such position that the pressure liquid cannot pass through them nothing happens. If however selector valve $h^3$ is raised, which can be done by the operating of the valve $o$, pressure fluid will pass from the pipe lines $m^7$, $m^8$ and $m^9$ to pipe lines $n$, $n^1$ and $n^2$ and thence to the cylinders of the six group, the exhaust liquid returning to the sump through the ports $m$, $m^1$ and $m^2$ and the pipe lines $m^3$. There is then a torque given by nine cylinders.

By closing selector valve $h^3$ and opening selector valve $h^4$, which can be done by the operation of the valves $o$ and $o^3$, the supply of pressure liquid to the six group is interrupted and pressure supplied to the nine group through pipe lines $n^3$, and $n^4$ and $n^5$. The torque is now that given by the three and nine groups and by opening both selector valves the torque given is that of all three groups.

It will therefore be appreciated that it is possible to obtain at will the torque given by three cylinders, nine cylinders, twelve cylinders and eighteen cylinders.

Likewise as in arrangement shown in Figure 8 when the selector valves are closed the liquid in the cylinders put out of action can pass through the passages $n^7$ and bores $n^6$ in selector valves $h^3$. and $h^4$ valves back to the sump, said passages then registering with the pipe lines connecting said valves to the cylinders.

To hold the load the control valves are raised, so that port $i^2$ of the right hand section of the control valve $h$ is connected to pressure thereby keeping the three cylinders of the three group full of liquid and port $i^3$ through which the liquid is exhausted, placed in communication with passage $j^6$, passage $j^5$ being sealed off.

The liquid passing through said cylinders is directed through passage $j^6$, passage $j^4$ and pipe line $j^7$ to the cylinder $j^8$ so that the piston $j^9$ is operated to apply the brake $k$.

If instead of holding it is desired to lower a load the control valve is raised so that the passages $j^5$ and $i^2$ are opened. This supplies pressure liquid to valve $h^1$ and which pressure liquid after exhausting from the cylinders of the three group is directed through the passage $i^5$, port $i^3$, annulus $k^6$ and passages $j^6$ and $j^4$ to the pipe line $j^7$ and to the cylinder $j^9$. At the same time however the opening of the passage $j^5$ to the exhaust releases the pressure on the brake. By regulating the amount of oil which passes through the passage $j^5$ to exhaust, the pressure on the brake cylinder $j^8$ can be controlled and with it the lowering speed.

If the supply of pressure liquid should fall the pistons of the three group will draw liquid from the sump through the non-return valve $k^3$, and through pipe line $k^2$ to the distributing valve $h^1$ and it is for this reason that springs $b^8$ (Fig. 3) should be introduced between the pistons of said cylinders to force same outwards.

When lowering an empty hook the main valve is raised to its extreme position so that pressure liquid flows through pipe connection $i^9$, through the distributing valve $h^1$ to the three group, the exhaust therefrom passing back to said distributing valve, port $i^3$ and passage $j^6$ and $j^5$ to the sump.

The direction of flow of the pressure liquid from valve $h$ to the distributing valve $h^1$ and from the distributing valve to the control valve is thereby reversed and this results in reversal of the motor.

Should a load be suddenly applied to the winch while hoisting the winch will tend to run back but the liquid forced by the three group will be prevented from returning to the supply line by means of the non-return valve $j^{11}$ and the motor will stall. A back pressure will therefore be created, which will be transmitted through pipe line $j^{15}$ to operate on the safety valve piston against the action of the spring and the pressure fluid thereon. The piston will consequently move to uncover the passage $j^{16}$ so that the built up pressure is then transmitted through pipe line $j^7$ to act on the piston $j^8$ which thereon applies the brake $k$. It will be noted that when the safety valve piston has been thus operated communication between the passage $j^4$ and the brake cylinder $j^8$ is interrupted.

In the arrangement shown in Figure 13 the motor, when lowering a load acts as a pump and circulates the pressure liquid in a closed circuit, the rate of lowering being controlled by throttling the flow of liquid in said circuit. Further in the event of a load being transferred to the hook which the motor is not set to cope with, the pressure liquid circulated by the three group, which is always in operation, is trapped and the accumulated pressure utilised to bring automatically the control valve to the hoisting position and to render operative all the cylinders of the other groups, or, alternatively, to apply a brake.

The arrangement comprises a control valve $u$, two distributing valves $u^1$ and $u^2$, two selector valves $u^3$ and $u^4$, two valves $u^5$ and $u^6$ for controlling the selector valves, the three group being supplied with pressure liquid by the distributing valve $u^1$ and the six and nine groups supplied by the distributing valve $u^2$ through the two selector valves $u^3$ and $u^4$ respectively when such valves are opened.

The control valve $u$ is of the piston type which works within a valve casing $u^7$ which has an extension enclosing $u^8$ in which works a piston $u^9$ carried by the valve.

The valve casing is provided with a port $v$ connected to the liquid pressure supply line $v^1$ in which is provided a non-return valve $v^{10}$. Said casing is also provided with a port $v^2$ connected by pipe line $v^3$ to three ports $v^4$, $v^5$ and $v^6$ in the distributing valve $u^2$, a port $v^7$ to which is connected an exhaust pipe line $v^8$, a port $v^9$ connected with other three ports $w$, $w^1$ and $w^2$ in said distributing valve through pipe line $w^3$ which latter is connected through a spring loaded relief valve $w^4$ with the said exhaust pipe line $v^8$.

Further the said valve casing is provided with a port $w^5$ connected by pipe line $w^6$ with three ports $w^7$, $w^8$ and $w^9$ in the distributing valve $u^1$ and also by pipe line $x$ to the foot of a safety valve casing $x^1$ within which is located a spring loaded valve. A port $x^4$ in the main valve is connected by pipe line $x^5$ to other three ports $x^6$, $x^7$ and $x^8$ in the distributing valve.

The port $x^4$ is also connected to a branch passage $x^9$ in the wall of the cylinder and which terminates within the valve casing.

A pipe line $x^3$ leads from the supply line $v^1$ to the top of the safety valve casing.

The safety valve casing is connected by pipe lines $x^{10}$ and $x^{11}$ to the cylindrical extension of the main control valve to act below the piston $u^9$ and is also connected by means of pipe connection $x^{10}$ and $x^{12}$ to a cylinder $y^1$ within which is a spring loaded piston $y^2$.

Said piston is connected to a slotted rod $y^3$ or interlock to which is connected by means of a pin and slot arrangement two arms connected to the control valves $u^5$ and $u^6$ of the selector valves in such manner that while normally said two control valves are capable of independent manual control, the movement of said piston $y^2$ against the action of the spring will operate said valves to open both selector valves. If one or both of the selector valves is or are already open such movement of the piston $y^2$ will, of course, have no effect thereon.

Distributing valve $u^1$ is provided with three ports connected by pipe lines $y^4$, $y^5$ and $y^6$ to the cylinders of the three group, and distributing valve $u^2$ is provided with three ports which are connected by pipe lines $y^7$, $y^8$ and $y^9$ to the two selector valves $u^3$ and $u^4$ which in turn are connected respectively by pipe lines $z$, $z^1$ and $z^2$ to the cylinders of the six group and by pipe lines $z^3$, $z^4$ and $z^5$ to the cylinders of the nine group.

The two distributing valves are provided with three pairs of pressure and exhaust ports, and are rotated in phase with the motor, through the gear wheel $g^3$ and gear wheels $z^6$ and $z^7$ meshing therewith and connected respectively to the two distributing valves, so that pressure liquid can be supplied to and exhausted from the motor cylinders, the valves making three rotations for each rotation of the motor.

To drive the motor with minimum torque, for example to raise an empty hook, the two selector valves $u^3$ and $u^4$ are closed and the piston of the main control valve raised up to uncover ports $v^2$ and $w^5$.

Pressure liquid supplied through the non-return valve $v^{10}$ then passes to the two distributing valves but as the selector valves are closed no liquid passes to the second and third group of cylinders. Pressure liquid however passes through the distributor valve $u^1$ and pipe lines $y^4$, $y^5$ and $y^6$ to the cylinders of the three group and is exhausted through the said pipe lines, ports $x^6$, $x^7$ and $x^8$, pipe line $x^5$, ports $x^4$ and $v^7$ to the sump. The motor is then driven with minimum torque.

To obtain greater torque selector valve $u^3$ is opened, this being done by operating the corresponding control valve $u^5$ so that pressure liquid is delivered to the foot of said selector valve and exhausted from the top thereof. Pressure liquid then passes through pipe lines $z$, $z^1$ and $z^2$ to energise the cylinders of the six group. The torque obtained is now that of the three group plus that of the six group. Still greater torque can be obtained by closing selector valve $u^3$ and opening selector valve $u^4$, this being effected by the operation of the control valves $u^5$ and $u^6$. Pressure liquid is then supplied to the cylinders of the nine group by the pipe lines $z^3$, $z^4$ and $z^5$. The torque then obtained is that of the combined three and nine groups. Finally full torque is obtained by opening both selector valves so that the cylinders of the first, six and nine groups are all energised.

The pressure liquid exhausted by the cylinders of the six and nine groups passes back through the corresponding selector valve or valves, through the ports $w$, $w^1$ and $w^2$, through pipe line $w^3$ to port $v^9$ and then through port $v^7$ to exhaust pipe line $v^8$ leading to the sump.

When a selector valve is closed the liquid in the corresponding cylinders is exhausted through a central bore therein.

Should it be desired to lower an empty hook, the selector valves are closed, the main control valve is moved down so that pressure liquid is supplied to the distributing valve $u^1$ through the port $x^4$, pipe line $x^5$, through ports $x^6$, $x^7$ and $x^8$ in the distributing valve $u^1$ and then to the cylinders of the group, the liquid being returned through the distributing valve and through pipe line $w^6$ to port $w^5$ through a passage $z^8$ passing centrally through the piston valve, port $v^9$ and through spring loaded relief valve $w^4$ to pipe line $v^8$ leading to the sump. That is the motor then drives in reverse with minimum torque.

To lower a load the appropriate selector valves should be open and the valve is again pushed down to uncover ports $x^4$, $w^5$ and $v^2$. The motor is then driven under the action of the load plus the action of the three group.

The six or nine or both six and nine groups circulate pressure liquid through the selector valves through pipe lines $y^7$, $y^8$ and $y^9$, the distributing valve $u^2$, ports $v^4$, $v^5$ and $v^6$, pipe line $v^3$ through port $v^2$ to the interior of the control valve casing, through the central passage in the main valve, through port $v^9$ and pipe connection, and through ports $w$, $w^1$ and $w^2$, and back to the distributing valve and then through the selector valve or valves back to the cylinders of the six or nine or both six and nine groups.

The pressure liquid discharged by the three group through pipe line $w^6$ is added to the liquid circulated by the other group or groups and maintains a minimum pressure determined by valve $w^4$ so that the pistons of the other group or groups are kept on their cross-heads against the action of the springs and remain operative, the surplus being exhausted through the relief valve $w^4$.

By throttling the circulating liquid, which can be done by operating the control valve so as to more or less cover the ports $v^2$ and $w^5$, the speed at which the load is lowered can be controlled.

If the main supply fails the cylinders of the three group draw pressure liquid from the sump through a non-return valve $z^9$ and ports $x^6$, $x^7$ and $x^8$ and deliver same through distributing valve $u^1$, ports $w^7$, $w^8$ and $w^9$, pipe line $w^6$ and port $w^5$. The said liquid delivered by the three group makes up any deficiency in the liquid circulated by the other groups, the excess passing through the spring loaded relief valve $w^4$ to the exhaust pipe line $v^8$. The said relief valve prevents the liquid from passing freely to exhaust and therefore ensures that the cylinders of the six and nine groups are maintained charged with liquid under pressure.

Now assume that a load is transferred to the hook which is greater than the motor is set to cope with so that the motor stalls. The piston of the main control valve is moved to the position shown. The three group of cylinders forcing back the liquid cannot circulate the liquid by reason of the ports $w^5$ and $x^4$ being sealed off. The pressure in pipe line $x$ and cylinder $x^1$ will therefore rise, and the spring loaded safety valve is raised to uncover the port to which is connected the pipe line $x^{10}$.

Pressure liquid then passes to the cylinders $u^8$ and $y^1$.

The piston $u^9$ is raised so that the main control valve is moved to the hoist position and the piston $y^2$ is moved to operate the control valves $u^5$ and $u^6$ so that both selector valves are opened.

The motor will then operate with maximum torque to raise the load.

The pressure liquid in the cylinder $u^8$ and in the cylinder $y^1$ will be relieved by leakage through a leak hole in said cylinder $u^8$.

Thereafter the motor can be controlled and the torque regulated as above set forth.

Should, however, the operator make a mistake and move the handle for hoisting the load the latter will overcome the action of the motor and will act to force the liquid back into the main supply line. The liquid cannot flow back on account of the non-return valve. The excessive pressure built up will raise the safety valve $x^1$ as described above.

The speed of the motor can be regulated by means of a valve controlling the admission of the pressure fluid to the main control valve.

The drawing shows, as an alternative arrangement to the saftey devices described above and operated by the pistons $u^9$ and $y^2$ a band brake $w^{10}$ operated by a piston $w^{11}$ and connected to pipe line $x^{12}$. When the safety valve $x^1$ lifts through excessive pressure in the system, the brake is applied and the load held thereby.

The motor shown in Figures 14, 15 and 16 comprises an annular member or stator A located within a casing B which supports in bearings $B^1$ the shaft C of the rotor.

The stator is provided with a series of circumferentially arranged transverse cylinder holes $A^1$ in each of which is located a pair of cylinder and piston assemblies similar to that shown in Figure 3. In the stator illustrated there are eighteen of such holes and it therefore carries thirty-six piston assemblies. Each piston operates a roller D.

Extending radially through the stator is a series of passages E, one leading to each of said holes $A^1$. Each passage at its inner end communicates with a transverse passage $E^1$ each of which, in turn, communicates at the two ends thereof with radial passages F and $F^1$, which terminate at the inner bore of the stator and which constitute pressure and exhaust passages for the pressure liquid delivered to and exhausted from the cylinders.

Making a close fit in said bore is the combined distributing and reversing valve G which is in the form of a sleeve having recesses or slots therein which will be hereafter described. Said valve in turn is fitted on a connecting tube $G^1$. The valve is keyed to said connecting tube so that while rotating therewith it can partake of a relative axial movement. The two ends of the connecting tube carry disc like members H and $H^1$ and on the opposed faces of said members are provided the cam tracks I and $I^1$ with which co-operate said rollers D. Said connecting tube takes up axial thrust on the two disc like members so that no end thrust bearings are required. The contours of the cam tracks are, as shown in Figure 16, exactly similar to those previously described. That is, the undulations are such that the rollers in contact therewith partake of a simple or substantially simple harmonic motion, and further such motion will be given to each roller six times during such rotation of the motor.

Said connecting tube is free on the shaft C.

Fitted over the tube and secured to the ends of the valve so as to rotate therewith are two discs J and $J^1$ and with the opposed faces thereof co-operates an axially movable plunger K housed in the stator but free to move axially therein. Said plunger, which fits exactly between the two discs J and $J^1$, is operatively connected through a bell crank lever and push rod $K^1$ or other mechanism to a hand lever $K^2$ pivoted to the casing at $K^3$.

Also extending through the stator is a pressure liquid supply passage L which is connected to a pipe line $L^1$ through which the pressure liquid from an accumulator or other source is supplied, the supply of the liquid being regulated by a main control valve $L^2$, Fig. 16.

Said passage L terminates in an annular chamber $L^4$ formed by an annular recess in the outer periphery of the distributing and reversing valve G and an annular recess formed in the inner bore of the stator.

The recess $L^4$ at one side thereof is provided with six lateral branches or slots which, as will be explained later, are used in hoisting, there being one relatively long slot M, two somewhat shorter slots $M^1$ and $M^2$ and three still shorter slots $M^3$, $M^4$ and $M^5$. The other side of said recess is likewise provided with six branches or slots, there being one N which is relatively long and five somewhat shorter slots $N^1$, $N^2$, $N^3$, $N^4$ and $N^5$, said slots being used in lowering.

Further the valve is provided on the outer periphery thereof with six exhaust slots O, $O^1$, $O^2$, $O^3$, $O^4$ and $O^5$ opposite the said slots used in hoisting and terminating at the right hand end of the valve, and a further six exhaust slots P, $P^1$, $P^2$, $P^3$, $P^4$ and $P^5$ opposite the slots used in lowering and terminating at the other end of the valve.

When the valve is in the position shown in Figure 16 it will be seen that as the rotor with the valve rotates only the pressure slot M registers with the passages $F^1$. Consequently pressure liquid introduced to the annular recess $L^4$ passes by way of said slot through passages $F^1$ to act on each pair of opposed pistons in turn, and each pair will have only one power stroke during each rotation of the rotor. The fluid exhausted from the cylinders pass through the passages F to the annular chamber, then to the exhaust slot $P^1$ and from there to the sump in the foot of the casing.

The valve in such position gives minimum torque.

The cams with which the rollers of the three group cooperate may, as indicated by the dotted lines U, be such that the pistons will have imparted thereto a shorter stroke than is imparted by the other cams.

To obtain greater torque the valve is moved axially to the right so that it will occupy such position that the slots $M^1$ and $M^2$ in addition to slot M register with the passages $F^1$. When in such position each passage $F^1$ is uncovered three times during each rotation of the rotor and each pair of opposed pistons will make three working strokes during each rotation. That is the torque has been increased three times.

The exhaust passes through the passages F and slots $P^3$ and $P^5$ to the sump.

To obtain full torque the valve is moved still further to the right so that the slots $M^3$, $M^4$ and $M^5$ also register with the passages $F^1$. Thus during each rotation of the rotor each passage $F^1$ is uncovered six times and each pair of opposed pistons is energised six times. The motor is therefore capable of giving three torques. When giving full torque the exhaust passes through all the slots P, $P^1$, $P^2$, $P^3$, $P^4$ and $P^5$.

It will be noted that the said exhaust slots are of such length that irrespective of the position of the valve during hoisting each registers with each of the passages F during a rotation.

Now assume that it is desired to lower a load. The valve is shifted to the left by the operation of the lever $K^2$ until only the slot N registers with the passages F, the exhaust slots O, $O^1$, $O^2$, $O^3$, $O^4$ and $O^5$ then registering with the passages $F^1$. The rotor will then be driven in the reverse direction by the pairs of opposed cylinders each of which is energised only once during each rotation.

By moving the valve further to the left the slots $N^1$, $N^2$, $N^3$, $N^4$ and $N^5$ in addition to slot N will register with the passages F so that each pair of opposed cylinders will be energised six times during each rotation. That is the rotor is then driven in the reverse direction with maximum torque.

When the drive is reversed each exhaust slot O, $O^1$, $O^2$, $O^3$, $O^4$ and $O^5$ will register with each of the passages $F^1$ during a rotation of the motor, and this is the case whether the motor is operating in the reverse at minimum or maximum torque.

It will be understood that the slots in the valve may be such as to give any desired torque ratios both in hoisting and lowering.

The hydraulic motor shown in Figure 14 drives the winch drum Q through a multi-plate friction brake.

Although such brakes are of known construction it may be stated that they consist of an outer sleeve R having two sets of ratchet teeth $R^1$ and $R^2$ both arranged to act in the same direction. Said sleeve encloses the friction plates $R^3$ half of which are splined to said sleeve and the other half splined to a driving member $R^4$ fast on the shaft C. Co-operating with ratchet teeth $R^1$ is a pawl $R^5$ carried by the disc like member $H^1$ and co-operating with the ratchet teeth $R^2$ is a pawl $R^6$ carried by the casing B. Said teeth and pawls act in the same direction.

A flange S is mounted as a nut on a screw threaded portion $S^1$ of the shaft C and functions to apply the load to the plates, said flange being driven by the disc like member $H^1$ through pins $S^2$.

When the motor is operated for hoisting the driving pawl $R^5$ rotates the sleeve R and the flange S which is also rotated partakes of an axial movement to the right so as to apply pressure to the friction plates $R^3$ and when the pressure is sufficient the plates rotate as a unit and drive the driving member $R^4$, and therefore the shaft and drum Q. In the meantime the fixed pawl $R^6$ glides over the ratchet teeth $R^2$.

When the motor is stopped it is held against backward rotation under the action of the load by the pawl $R^6$ engaging with the teeth $R^2$, any tendency of the winch drum to rotate in the reverse direction simply increasing the pressure on the friction plates and thereby preventing slip.

In lowering a load the motor is rotated in the reverse direction, the sleeve R being held by the pawl $R^6$ and the pawl $R^5$ gliding over the ratchet teeth $R^1$.

Flange S then releases its pressure on the friction plates since it is rotated to move to the left.

The load is now free to follow up the motor but the winch drum cannot rotate faster than the motor. Should it commence to do so the pressure on the friction plates is again applied thus slowing down the winch drum.

The distributing valve illustrated in Figures 17 and 18 comprises a valve casing V and, located therein a cylinder $V^1$. The casing is provided with an inlet port $V^2$ located towards one end thereof and an exhaust port $V^3$ located towards the other end thereof. The casing is also provided with one or more rows of ports $V^4$ for connection to the motor cylinders. In the drawings two rows of such ports are shown, one row for connection to the cylinders of the three group and the other row for connection to the cylinders of the six and nine groups.

The cylinder is provided with four equidistant spiral grooves or recesses $V^5$, $V^6$, $V^7$ and $V^8$.

Two diametrically opposite grooves $V^5$ and $V^7$ are in communication with an annulus $V^9$ which in turn is in communication with the inlet port $V^2$. The other ends of said grooves are closed.

The other two grooves $V^6$ and $V^8$, which are also diametrically opposite to each other, are in communication with an annulus $V^{10}$ which in turn is in communication with the exhaust port $V^3$. The other ends of said grooves are closed.

The cylinder is driven in timed relationship with the motor.

Pressure liquid supplied through a pipe line to the inlet port $V^2$ passes into the annulus $V^9$, then into the grooves $V^5$ and $V^7$ and then through the ports $V^4$ to the cylinders of the motor. The exhaust from the cylinders passes through the ports into the grooves $V^6$ and $V^8$ and thence to the annulus $V^{10}$ and exhaust port $V^3$ to the sump.

Reversal of the motor is effected by rotating the cylinder through 90° so that the cylinders previously supplied with pressure liquid will now be opened to exhaust and the other cylinders supplied with pressure liquid.

In such distributing valve the pressure liquid is always in two diametrically opposite grooves. That is the pressure on the cylinder is balanced evenly on both sides so that wear is reduced and the rotation of the valve more easily effected by reason of the reduction in friction.

Figure 19 shows diagrammatically the application of a hunting gear to the control valve in an arrangement similar to that shown in Figure 8.

In Figure 19, W designates the control valve, $W^1$ is one of the two distributing valves supplied with pressure liquid by the control valve and $W^2$ is the winch drum.

The valve W is controlled by a handwheel $W^3$ mounted on a screw threaded spindle W⁴ on which is threaded a ball nut W⁵ carried by one end of lever W⁶ pivoted at W⁷. The other end of said lever carries a ball nut W⁸ threaded on a screw threaded portion of a spindle W⁹. This spindle is coupled to the valve spindle W¹⁰ in such manner that axial movement of the spindle will transmit a corresponding movement to the valve W while at the same time the spindle is capable of independent relative rotary movement.

Keyed to slide axially relatively to the spindle is a worm wheel W¹¹ which meshes with a worm W¹² on the shaft of the drum.

To hoist the handle W³ is turned anti-clockwise, thereby causing the ball nut W⁵ to move to the left and rock the lever W⁶ about its pivot so that the control valve is moved to the hoisting position.

As the winch drum rotates it drives through the worm and worm wheel the spindle W⁹ which, by turning in the ball nut W⁸ moves to the left so as to move the control to the neutral position. Thus it is necessary to keep turning the hand wheel as aforesaid to keep the winch hoisting. If such rotation is stopped the hunting gear will follow up and cut off the supply of pressure liquid. Similarly by rotating the handwheel in the reverse direction the motor can be driven in the reverse direction but, through the hunting gear, will stop after the handwheel has been brought to rest. The number of revolutions of the winch motor in any one direction is limited, the limitation being controlled by the travel of the ball nut W⁵, the lead of screw portion of the spindle W⁹, and the gear ratio of the worm to the worm wheel.

What I claim as my invention and desire to secure by Letters Patent is:

1. A multi-cylinder hydraulic motor comprising in combination a driving shaft, a plurality of cylinders adapted to be connected in groups to a supply of fluid under pressure, a piston in each cylinder, means by which each piston when subjected to hydraulic pressure in its cylinder imparts torque to the driving shaft, valve means for controlling the flow of liquid under pressure to said cylinders, valve means for reversing the direction of flow of fluid under pressure to at least one of said groups of cylinders, and means operatively connected with said valve means by which at least one group of cylinders can be rendered inoperative for imparting torque while the cylinders in at least one other group are permitted to be fully operative, said valve means and means operatively connected therewith being arranged selectively to provide flow to a predetermined group of cylinders for driving the motor in reverse direction and simultaneously to render all other cylinders inoperative for imparting driving torque to said shaft.

2. In a multi-cylinder hydraulic motor as set forth in claim 1, means for directing the pressure liquid that is exhausted from said predetermined group into a circuit to which the other groups of inoperative cylinders are connected, means for keeping a certain minimum pressure in this circuit, and valve means for controlling the speed of the motor when it is reversed under the action of a load by throttling the flow in said circuit to provide braking action.

3. A multi-cylinder hydraulic motor according to claim 1, wherein the cylinders of said predetermined group of reversing cylinders are smaller in diameter than the cylinders of other groups.

4. A multi-cylinder hydraulic motor according to claim 1 having means by which when the motor is running in reverse direction the pressure liquid exhausted from said reversely operated cylinders is used to control the motor.

5. A multi-cylinder hydraulic motor comprising a driving shaft, a plurality of cylinders, a piston in each cylinder, means by which each piston when subjected to hydraulic pressure in its cylinder imparts torque to the driving shaft, a supply line arranged to supply pressure liquid to the cylinders for driving the motor in a forward direction, a one-way valve in said line for preventing reverse flow through it, and means connected with said line between the cylinders and said valve and arranged to be actuated to control the motor by pressure of liquid in said line caused by said cylinders when the motor stalls due to an excessive load.

6. A multi-cylinder hydraulic motor according to claim 5, including valve means actuated by fluid pressure from the cylinders caused by stalling of the motor by an excessive load, said means being arranged to put into operation cylinders that are inoperative when such stalling takes place.

7. A multi-cylinder hydraulic motor comprising in combination, a driving shaft, an annulus mounted on the driving shaft and having on it inclined surfaces operative as cams and together constituting a continuous cam track, a plurality of cylinders, a piston in each cylinder, means by which each piston when subjected to hydraulic pressure in its cylinder acts on this cam track and through it imparts torque to the driving shaft, means for controlling the flow of liquid under pressure to the several cylinders in groups, and means by which a group of cylinders can be rendered inoperative while the cylinders in at least one other group are permitted to be fully operative.

8. A multi-cylinder hydraulic motor according to claim 7, wherein the means for controlling the flow of liquid under pressure to the several groups of cylinders and the means for rendering cylinders inoperative are arranged selectively to provide flow to a predetermined group of cylinders in a manner to reverse their operation for driving the motor in reverse direction and simultaneously to render inoperative all other groups of cylinders, said motor having a brake and operating means for said brake arranged to be actuated by liquid exhausted by said reversely operating cylinders when the motor is running in reverse direction.

9. A multi-cylinder hydraulic motor comprising in combination a driving shaft, an annulus mounted on the driving shaft and having on it inclined surfaces operative as cams and together constituting a continuous cam track, a plurality of cylinders mounted on a fixed member the cylinders being spaced apart with the axes of all of them passing through the said cam track, a piston in each cylinder, means by which each piston when subjected to hydraulic pressure in its cylinder acts on this cam track and through it imparts torque to the driving shaft, means for controlling the flow of liquid under pressure to the several cylinders in groups, and means by which a group of cylinders can be rendered inoperative while the cylinders in at least one other group are permitted to be fully operative.

10. A multi-cylinder hydraulic motor comprising in combination, a driving shaft, at least one annulus mounted on the driving shaft and having on its inclined surfaces operative as cams and together constituting a continuous cam track, a fixed annular member coaxial with the driving shaft, a plurality of cylinders mounted on this fixed member the cylinders being spaced apart circumferentially with the axes of all of them parallel with the axis of the driving shaft and these cylinder axes severally passing through the said cam track, a piston in each cylinder, means by which each piston when subjected to hydraulic pressure in its cylinder acts on this cam track and through it imparts torque to the driving shaft, means for controlling the flow of liquid under pressure to the several cylinders in groups, and means by which a group of cylinders can be rendered inoperative while the cylinders in at least one other group are permitted to be fully operative.

11. A multi-cylinder hydraulic motor comprising in combination, a driving shaft, a plurality of cylinders, a piston in each cylinder, means by which each piston when subjected to hydraulic pressure in its cylinder imparts torque to the driving shaft, at least one rotary distributing valve controlling the flow of liquid under pressure to the several cylinders in groups, means by which the distributing valve can be actuated to selectively determine that a group of cylinders shall be inoperative while the cylinders in at least one other group shall be fully operative, means for rotating this distributing valve in phased relation with the driving shaft, and means for controlling the flow of liquid under pressure to the said distributing valve.

12. A multi-cylinder hydraulic motor comprising in combination, a driving shaft, a plurality of cylinders, a piston in each cylinder, means by which each piston when subjected to hydraulic pressure in its cylinder imparts torque to the driving shaft, at least one rotary distributing valve controlling the flow of liquid under pressure to the several cylinders in groups, means by which the distributing valve can be actuated to selectively determine that a group of cylinders shall be fully operative while the cylinders in at least one other group shall be inoperative, means for rotating this distributing valve in phased relation with the driving shaft, means for varying the flow through this distributing valve for the purpose of reversing the motor, and means for controlling the flow of liquid under pressure to the said distributing valve.

13. A multi-cylinder hydraulic motor comprising in combination, a driving shaft, a plurality of cylinders disposed so as to be controllable in groups, a piston in each cylinder, means by which each piston when subjected to hydraulic pressure in its cylinder imparts torque to the driving shaft, at least one distributing valve controlling the flow of liquid under pressure to the cylinders in at least one group, at least one selector valve controlling the flow of liquid under pressure to the cylinders in at least one other group, means for driving the said distributing valve in phased relation with the driving shaft, means for varying the flow through said distributing valve for the purpose of reversing the motor, and means for controlling the selector valve whereby it can be closed when the phasing of the distributing valve is altered for reversing the motor, the controls for the said distributing valve and the said selector valve enabling a group of cylinders to be rendered inoperative while the cylinders in at least one other group are permitted to be fully operative.

14. A multi-cylinder hydraulic motor comprising in combination a driving shaft, a plurality of cylinders disposed so as to be controllable in groups, a piston in each cylinder, means by which each piston when subjected to hydraulic pressure in its cylinder imparts torque to the driving shaft, a distributing valve controlling the flow of liquid under pressure to and from the cylinders in one group, at least one other distributing valve controlling the flow of liquid under pressure to and from the cylinders in at least one other group, means for driving each distributing valve in phased relation with the driving shaft, at least one selector valve which controls the supply of liquid under pressure to the cylinders controlled by the said other distributing valve the actuation of such selector valve determining whether a cylinder group controlled by the said other distributing valve shall be rendered inoperative or permitted to be fully operative.

15. A multi-cylinder hydraulic motor comprising in combination the parts as set out in claim 12 having means by which when the motor is running in the reverse direction pressure liquid is supplied only to certain of the cylinders, and means by which the pressure liquid exhausted from these cylinders is used to control the motor.

16. A multi-cylinder hydraulic motor comprising in combination, a driving shaft, two annular cam tracks mounted oppositely on the shaft and spaced apart in the axial direction, an annular member fixed around and concentric with the driving shaft and lying between the said cam tracks, a plurality of cylinders mounted in this fixed annular member in which they are spaced apart circumferentially and lie with their axes parallel to the shaft axis, two pistons adapted to reciprocate oppositely in each cylinder, a yielding member between each piston and the cam track opposite to it and through which the piston acts on that cam track when subjected to liquid pressure in its cylinder while when not acted on by liquid pressure the piston will remain immobile at the inner end of its cylinder, at least one rotary distributing valve controlling the flow of liquid under pressure to the cylinders in groups, means for driving this distributing valve in phase with the driving shaft, and means for selectively determining that a group of cylinders shall be inoperative while the cylinders in at least one other group shall be fully operative.

17. A multi-cylinder hydraulic motor comprising in combination, a driving shaft, two annular cam tracks mounted oppositely on the shaft and spaced apart in the axial direction, an annular member fixed around and concentric with the driving shaft and lying between the said cam tracks, a plurality of cylinders mounted in this fixed annular member in which they are spaced apart circumferentially and lie with their axes parallel to the shaft axis, two pistons adapted to reciprocate oppositely in each cylinder, a yielding member between each piston and the cam track opposite to it and through which the piston acts on that cam track when subjected to liquid pressure in its cylinder while when not acted on by liquid pressure the piston will remain immobile at the inner end of its cylinder, at least one rotary distributing valve controlling the flow of liquid under pressure to the cylinders in groups, means for driving this distributing valve in phase with the driving shaft, means for varying the flow through this distributing valve so as to effect reversing of the motor, and means whereby while one group of cylinders is always fully operative other groups of cylinders are rendered inoperative or permitted to be operative according to the torque to be transmitted, but when running in reverse all such other cylinder groups are rendered inoperative.

18. A multi-cylinder hydraulic motor comprising in combination the parts as set out in claim 17 in which the distributing valve is rotatable relatively to the mechanism by which it is driven so as to alter its phasing with respect to the driving shaft, and this distributing valve is also movable in the direction of its axis whereby the group selection of the cylinders is effected to vary the torque transmitted.

19. A multi-cylinder hydraulic motor comprising in combination, a driving shaft, two annular cam tracks mounted oppositely on the shaft and spaced apart in the axial direction, an annular member fixed around and concentric with the driving shaft and lying between the said cam tracks, a plurality of cylinders mounted in this fixed member in which they are spaced apart circumferentially and lie with their axes parallel to the shaft axis, two pistons adapted to reciprocate oppositely in each cylinder, a yielding member between each piston and the cam track opposite to it and through which the piston acts on that cam track when subjected to liquid pressure in its cylinder while when not acted on by liquid pressure the piston will remain immobile at the inner end of its cylinder, at least one rotary distributing valve controlling the flow of liquid under pressure to the cylinders in at least one group, at least one selector valve controlling the flow of liquid under pressure to the cylinders in at least one other group, means for driving the said distributing valve in phased relation with the driving shaft, and means for controlling and actuating the said distributing and selector valves and for altering the phasing of the distributing valve for the purpose of varying the torque transmitted and for reversing the motor, whereby while one group of cylinders is always fully operative other groups of cylinders are rendered inoperative or permitted to be operative according to the torque to be transmitted, but when running in reverse all other cylinder groups are rendered inoperative.

20. A multi-cylinder hydraulic motor comprising in combination a driving shaft, a plurality of cylinders, a piston in each cylinder, means by which each piston when subjected to hydraulic pressure in its cylinder imparts torque to the driving shaft, at least one rotary distributing valve controlling the flow of liquid under pressure to the several cylinders in groups, means for rotating this distributing valve in phased relation with the driving shaft, means for controlling the speed and direction of flow of the liquid under pressure passing to the said distributing valve whereby the motor may be caused to rotate in the reverse direction, and means for selectively determining that a group of cylinders shall be inoperative while the cylinders in at least one other group shall be fully operative.

21. A multi-cylinder hydraulic motor comprising in combination a driving shaft, a plurality of cylinders, a piston in each cylinder, means by which each piston when subjected to hydraulic pressure in its cylinder imparts torque to the driving shaft, means for controlling the flow of liquid under pressure to the several cylinders in groups, means by which a group of cylinders can be rendered inoperative while the cylinders in at least one other group are permitted to be fully operative, means for varying the speed and direction of flow of liquid under pressure to the several cylinder groups whereby the direction of rotation of the motor can be reversed, at least one non-return valve in a passage through which flows the liquid under pressure as supplied to the cylinders, such non-return valve when the motor is running in reverse causing a back pressure to be set up, and means for using this back pressure to control the rotation of the motor and mechanism driven thereby.

22. A multi-cylinder hydraulic motor comprising in combination the parts as set out in claim 21 in which there is a brake adapted to be operated by liquid under pressure, and a valve which when the back pressure set up while the motor is running in reverse will be lifted when the back pressure exceeds the pressure of the main liquid supply and will permit this pressure liquid to actuate the said brake.

23. A multi-cylinder hydraulic motor comprising in combination the parts as set out in claim 21 in which means are provided whereby if the back pressure set up while the motor is running in reverse owing to an excessive load being placed thereon exceeds the pressure of the main liquid supply this back pressure will actuate mechanism controlling the motor and cause the motor to operate with full torque against the action of the said load.

24. A multi-cylinder hydraulic motor comprising in combination a driving shaft, a plurality of cylinders, a piston in each cylinder, means by which each piston when subjected to hydraulic pressure in its cylinder imparts torque to the driving shaft, means for controlling the flow of liquid under pressure to several cylinders in groups, means by which at least one group of cylinders can be rendered inoperative for driving while the cylinders in at least one other group are permitted to be fully operative, means to provide liquid flow to a predetermined group of cylinders in a manner to reverse their operation for driving the motor in the reverse direction and simultaneously to render inoperative for driving all other groups of cylinders while permitting them to remain operative for braking, means for directing the pressure liquid which is exhausted from said predetermined group into a circuit to which the other groups of inoperative cylinders are connected, means for keeping a certain minimum pressure in this circuit, and valve means for controlling the speed of the motor when it is reversed under the action of a load by throttling the flow in said circuit to provide braking action.

MAXIMILIAAN FREDERIK GUNNING.

REFERENCES CITED

The following references are of record in the file of this patent:

UNITED STATES PATENTS

| Number | Name | Date |
|---|---|---|
| 1,370,290 | Crofton | Mar. 1, 1921 |
| 2,006,237 | Eynard | June 25, 1935 |
| 2,074,618 | Roeder | Mar. 23, 1937 |
| 2,095,255 | Holmes | Oct. 12, 1937 |
| 2,258,307 | Vickers | Oct. 7, 1941 |
| 2,290,932 | Aikman | July 28, 1942 |
| 2,303,685 | Eden et al. | Dec. 1, 1942 |
| 2,326,464 | Jones | Aug. 10, 1943 |